United States Patent
Goel et al.

(10) Patent No.: US 11,079,971 B2
(45) Date of Patent: Aug. 3, 2021

(54) INPUT/OUTPUT (I/O) FENCING WITHOUT DEDICATED ARBITRATORS

(71) Applicant: Veritas Technologies LLC, Mountain View, CA (US)

(72) Inventors: Vikas Goel, Maharashtra (IN); Jai Gahlot, Maharashtra (IN); Shailesh Marathe, Maharashtra (IN); Abhijit Toley, Maharashtra (IN); Narender Singh Mehra, Uttar Pradesh (IN)

(73) Assignee: Veritas Technologies LLC, Santa Clara, CA (US)

( * ) Notice: Subject to any disclaimer, the term of this patent is extended or adjusted under 35 U.S.C. 154(b) by 72 days.

(21) Appl. No.: 15/476,415

(22) Filed: Mar. 31, 2017

(65) Prior Publication Data

US 2018/0285221 A1    Oct. 4, 2018

(51) Int. Cl.
*G06F 11/00*    (2006.01)
*G06F 3/06*    (2006.01)
*G06F 13/16*    (2006.01)
*G06F 11/14*    (2006.01)

(52) U.S. Cl.
CPC ............ *G06F 3/0665* (2013.01); *G06F 3/067* (2013.01); *G06F 3/0617* (2013.01); *G06F 3/0619* (2013.01); *G06F 3/0659* (2013.01); *G06F 3/0689* (2013.01); *G06F 13/1605* (2013.01); *G06F 11/142* (2013.01)

(58) Field of Classification Search
CPC .. H04W 12/069; H04W 48/18; H04L 67/125; H04L 41/0659; H04L 41/0668; G06F 3/0634
See application file for complete search history.

(56) References Cited

U.S. PATENT DOCUMENTS

| | | | | |
|---|---|---|---|---|
| 6,021,508 A * | 2/2000 | Schmuck | ............ | G06F 16/1858 714/4.5 |
| 6,708,269 B1 * | 3/2004 | Tiruvallur | ............ | G06F 9/3004 711/141 |
| 7,168,088 B1 * | 1/2007 | Matena | ............... | G06F 11/2033 709/217 |
| 7,478,221 B1 * | 1/2009 | Karr | ...................... | G06F 3/0605 711/203 |
| 7,631,066 B1 | 12/2009 | Schatz et al. | ................. | 709/224 |
| 8,060,773 B1 * | 11/2011 | Katkar | ................ | G06F 11/1425 714/4.1 |
| 8,699,322 B1 * | 4/2014 | Tawri | ................ | H04L 29/12207 370/216 |
| 8,707,082 B1 * | 4/2014 | Chen | ................... | G06F 11/0709 707/790 |
| 9,124,534 B1 * | 9/2015 | Bhalerao | ............. | H04L 41/0893 |
| 9,146,790 B1 * | 9/2015 | Dash | ....................... | G06F 11/00 |
| 9,450,852 B1 * | 9/2016 | Chen | ...................... | H04L 43/10 |
| 9,852,034 B2 * | 12/2017 | Akirav | ............... | G06F 11/2007 |
| 10,264,065 B2 * | 4/2019 | Gahlot | ............... | H04L 67/1034 |

(Continued)

*Primary Examiner* — Loan L. T. Truong

(74) *Attorney, Agent, or Firm* — Campbell Stephenson LLP

(57) ABSTRACT

Disclosed herein are methods, systems, and processes to perform input/output (I/O) fencing without dedicated arbitrators. A coordination storage identifier is stored in a storage device as metadata. The coordination storage identifier is associated with a node of a cluster coupled to the storage device, and an I/O fencing operation is performed using the coordination storage identifier.

20 Claims, 11 Drawing Sheets

(56) References Cited

U.S. PATENT DOCUMENTS

| | | | |
|---|---|---|---|
| 10,412,066 B1* | 9/2019 | Vemuri | G06F 9/45533 |
| 2003/0079100 A1* | 4/2003 | Williams | G06F 11/1435 |
| | | | 711/165 |
| 2006/0168192 A1* | 7/2006 | Sharma | G06F 11/2028 |
| | | | 709/224 |
| 2010/0306573 A1* | 12/2010 | Gupta | G06F 11/1425 |
| | | | 714/4.1 |
| 2011/0145631 A1* | 6/2011 | Shankar | G06F 11/0709 |
| | | | 714/4.11 |
| 2012/0117281 A1* | 5/2012 | Blocksome | G06F 13/28 |
| | | | 710/22 |
| 2012/0179771 A1* | 7/2012 | Ganti | G06F 11/1425 |
| | | | 709/213 |
| 2012/0311122 A1* | 12/2012 | Johnsen | H04L 9/3271 |
| | | | 709/223 |
| 2013/0227558 A1* | 8/2013 | Du | G06F 9/45558 |
| | | | 718/1 |
| 2013/0246666 A1* | 9/2013 | Vemuri | G06F 3/0622 |
| | | | 710/15 |
| 2014/0040671 A1* | 2/2014 | Akirav | G06F 11/1612 |
| | | | 714/45 |
| 2014/0081927 A1* | 3/2014 | Lipcon | G06F 11/2028 |
| | | | 707/692 |
| 2017/0093746 A1 | 3/2017 | Gahlot et al. | 47/746 |
| 2017/0094003 A1* | 3/2017 | Gahlot | H04L 47/746 |
| 2017/0116095 A1* | 4/2017 | Schatz | G06F 11/2033 |
| 2017/0318092 A1* | 11/2017 | Maredia | H04L 47/70 |
| 2018/0007129 A1* | 1/2018 | Gahlot | H04L 67/1034 |
| 2018/0285221 A1* | 10/2018 | Goel | G06F 3/0617 |

\* cited by examiner

300

| Fencing Operations Table 305 ||
|---|---|
| Volume Manager Action Field 310 | Fencing Engine Action Field 315 |
|  | Register volume manager compliant data key (e.g., APGR0001) on designated coordination logical unit number (LUN) |
| Register same data key (e.g., APGR0001) on LUNs managed by volume manager including coordination LUN |  |
|  | Declare fencing race result |
| Receive notification from winner node to clear data keys from remaining LUNs |  |
| Eject data keys from remaining LUNs and resume operation |  |
|  | Eject data key from coordination LUN at time of network partition and node hang |
|  | Remove data key (e.g., APGR0001) from coordination LUN if not removed by volume manager |
| Remove data keys from LUNs at stack wind down |  |

FIG. 3

INPUT/OUTPUT (I/O) FENCING WITHOUT DEDICATED ARBITRATORS

FIELD OF THE DISCLOSURE

The present disclosure relates to distributed storage in clustered environments. In particular, this disclosure relates to performing input/output (I/O) fencing operations without dedicated arbitrators in such clustered environments.

DESCRIPTION OF THE RELATED ART

A cluster is a distributed computing system with several nodes that work together to provide processing power and shared storage resources by spreading processing load over more than one node, as well as eliminating or at least minimizing single points of failure. Therefore, different applications running on multiple nodes can continue to function despite a problem with one node (or computing device) in the cluster. Clusters can be implemented in computing devices called appliances.

An appliance is a hardware device with integrated software (e.g., firmware), designed to provide one or more business services. Appliances can also be configured with hardware and/or software to enable them to function as clients and/or servers. An end user of these clients and/or servers need not understand the technical details of the underlying operating system running on the appliances because the hardware and/or software is preconfigured (e.g., by a manufacturer). In this manner, appliances are designed to be secure black boxes for the end user (e.g., a customer). Multiple standalone nodes (e.g., compute nodes) can be configured to execute within a given appliance to provide high-availability of data.

Input/output (I/O) fencing (or simply, fencing) refers to the process of isolating a node of a cluster, and/or protecting shared resources of the cluster when the node malfunctions (or appears to malfunction). Because a cluster implemented in an appliance can have multiple computes nodes (or simply, nodes), there is a likelihood that one of the nodes may fail at some point. The failed node may have control over (or at least, access to) shared resources such as shared storage used and required by the other nodes in the cluster. A cluster must be capable of taking corrective action when a node fails, because data corruption can occur if two nodes in different sub-clusters or network partitions attempt to take control of shared storage in an uncoordinated manner. Therefore, a fencing operation results in the fencing-off (or termination) of one or more nodes in the cluster (e.g., to prevent uncoordinated access to shared storage).

Typically, external computing devices called coordination points are implemented assist with fencing operations. Coordination points are computing devices (e.g., servers or storage devices) that provide a lock mechanism to determine which node (or nodes) are allowed to fence off shared storage (e.g., data drives) from other nodes in the cluster. For example, a node must eject (or uninstall) a registration key of a peer node from a coordination point before that node is allowed to fence the peer node from shared storage. However, for a cluster implemented in an appliance, using coordination points to perform fencing operations is not practical because, as noted above, appliances are designed to be secure and unmodifiable black boxes.

As previously noted, an appliance is designed to function only with the appliance's own internal software and hardware components (including storage shelves). Typically, in existing appliance deployments, storage shelves (e.g., shared storage devices) are configured as backup target spaces, and therefore a high-availability solution provided in such computing environments cannot avail itself of dedicated arbitrators (e.g., coordination points) for fencing operations. In addition, internal services provided by an appliance are not generally exposed to (and are not accessible by) users or other computing devices (e.g., external clients). Therefore, the possibility of using a dedicated arbitrator to perform fencing operations in a high-availability cluster implemented within an appliance is not desirable as appliances implemented in a high-availability computing environment do not have dedicated arbitrators and are not upgradeable.

SUMMARY OF THE DISCLOSURE

Disclosed herein are methods, systems, and processes to perform input/output (I/O) fencing without dedicated arbitrators. One such method involves storing a coordination storage identifier in a storage device as metadata. In this example, the coordination storage identifier is associated with a node of a cluster coupled to the storage device, and an I/O fencing operation is performed using the coordination storage identifier.

In one embodiment, the method accesses a configuration file that includes fencing mode metadata that identifies the coordination storage identifier. In this example, the coordination storage identifier identifies a coordinator and data disk, and the coordination storage identifier is a data key generated by a volume manager executed by the node.

In some embodiments, the method identifies one or more storage identifiers other than the coordination storage identifier to identify one or more data disks, determines that another node other than the node has lost a fencing race, and determines whether the data key has been ejected from the coordinator and data disk by a fencing engine. In this example, if the data key has not been ejected from the coordinator and data disk by the fencing engine, the method ejects the data key from the coordinator and data disk.

In other embodiments, the method detects that the cluster is partitioned into two or more network partitions, and ejects the data key from the coordinator and data disk. In this example, upon ejecting the data key from the coordinator and data disk, the method determines a result of the fencing race that is performed as part of the I/O fencing operation.

In certain embodiments, the method determines another node is a loser node, sends a notification to the volume manager of the loser node to eject the data key from one or more data disks other than coordinator and data disk, and receives confirmation from the volume manager that the data key has been ejected from one or more data disks. In this example, the coordinator and data disk and one or more data disks are shared by the node and the another node.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3 is table 300A that illustrates a fencing operations table, according to one embodiment of the present disclosure.

Figure 1A:
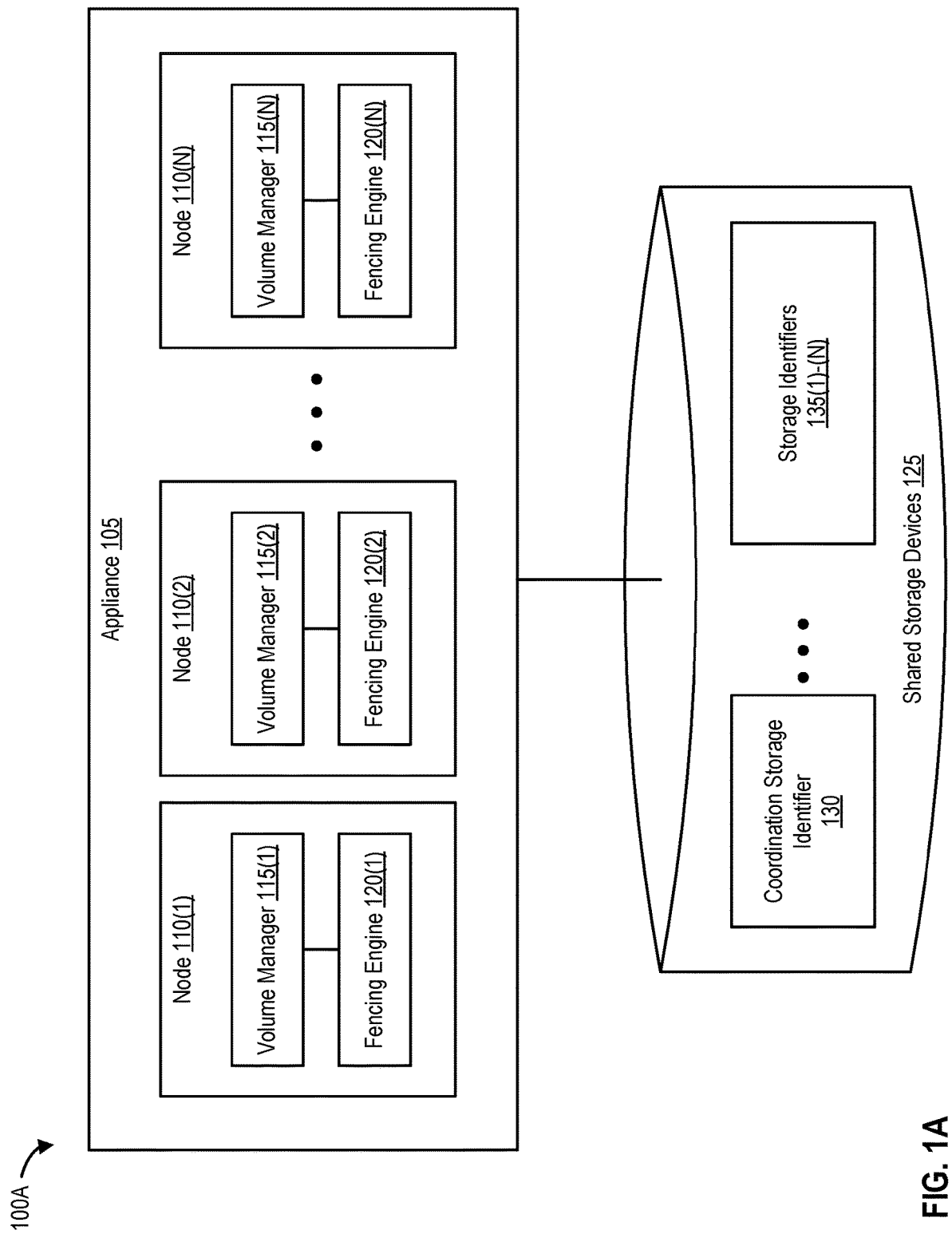
FIG. 1A is a block diagram 100A of a computing system that is configured to perform input/output (I/O) fencing without dedicated arbitrators, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

An appliance can be configured to execute critical applications (e.g., to protect important customer data). It is desirable for applications executing within such appliances to be highly-available. For example, an appliance with a single compute node (e.g., a node with dedicated memory, processing power, and the like), can be upgraded by the addition of one or more additional compute nodes to provide high-availability of data. Therefore, an appliance can be configured to implement a cluster of nodes, for example.

"Split-brain" refers to a condition (or situation) where the availability of data (e.g., from shared storage) risks becoming inconsistent due to maintenance of separate data sets that overlap in scope. For example, such overlap can potentially occur because of a network partition where sub-clusters are unable to communicate with each other to synchronize their respective data sets. The data sets of each sub-cluster (or network partition) may randomly serve clients by their own idiosyncratic data set updates, without coordination with other data sets from other sub-clusters. Therefore, when a split-brain condition occurs in a cluster, the decision of which sub-cluster should continue to operate is called a partition arbitration process, or simply arbitration. Typically, and as previously noted, arbitration in such clustered environments is performed by executing I/O fencing operations using coordination points.

A high-availability data solution, such as the one as described above, needs to protect the computing setup from data corruption by performing I/O fencing operations in the cluster. As noted, a traditional I/O fencing operation requires dedicated arbitrators (e.g., coordination disks and/or coordination point servers) to reliably maintain only one sub-cluster active in such situations (e.g., during system hang). Because appliances are designed to function in a standalone manner (e.g., with only internal software and hardware components including storage shelves) and the storage shelves (e.g., shared storage devices) are configured as backup target space, such an appliance-based high-availability solution cannot utilize dedicated arbitrators such as coordination disks or coordination point servers for I/O fencing operations.

Therefore, it will be appreciated that it is desirable to have an I/O fencing solution that can reliably manage actual split-brain and system hang situations, and provide storage access only to one sub-cluster to prevent data corruption in a cluster with fully configured shared storage appliance configuration. Described herein are methods, systems, and processes to perform I/O fencing operations without dedicated arbitrators.

Example System for Input/Output (I/O) Fencing without Dedicated Arbitrators

FIG. 1A is a block diagram 100A of a computing system that is configured to perform input/output (I/O) fencing without dedicated arbitrators, according to one embodiment. As shown in FIG. 1A, appliance 105 includes nodes 110 (1)-(N) and is communicatively coupled to shared storage devices 125 (e.g., directly, or via a network or some other type of interconnection). Each of nodes 110(1)-(N) are separate and independent compute nodes because each of nodes 110(1)-(N) include their own memory and processor. In this manner, each of nodes 110(1)-(N) function as standalone computing devices.

Node 110(1) is an example representative of the other nodes in appliance 105 (e.g. nodes 110(2)-(N)), and includes a volume manager 115(1) and a fencing engine 120(1). Volume manager 115(1) (e.g., Cluster Volume Manager (CVM)) manages one or more data disks that are part of shared storage devices 125. Fencing engine 120(1) (e.g., VxFEN) performs I/O fencing operations. Each node in appliance 105 (e.g., nodes 110(1)-(N)) includes at least a volume manager and a fencing engine.

Appliance 105 is communicatively coupled to shared storage devices 125. Shared storage devices 125 are shared by nodes 110(1)-(N) and can include multiple different storage devices (e.g., one coordinator and data disk and one or more data disks). As shown in FIG. 1A, a coordinator and data disk is identified by coordination storage identifier 130, and data disks are identified by storage identifiers 135(1)-(N). In certain embodiments, coordination storage identifier 130 and storage identifiers 135(1)-(N) are data keys.

Figure 1B:
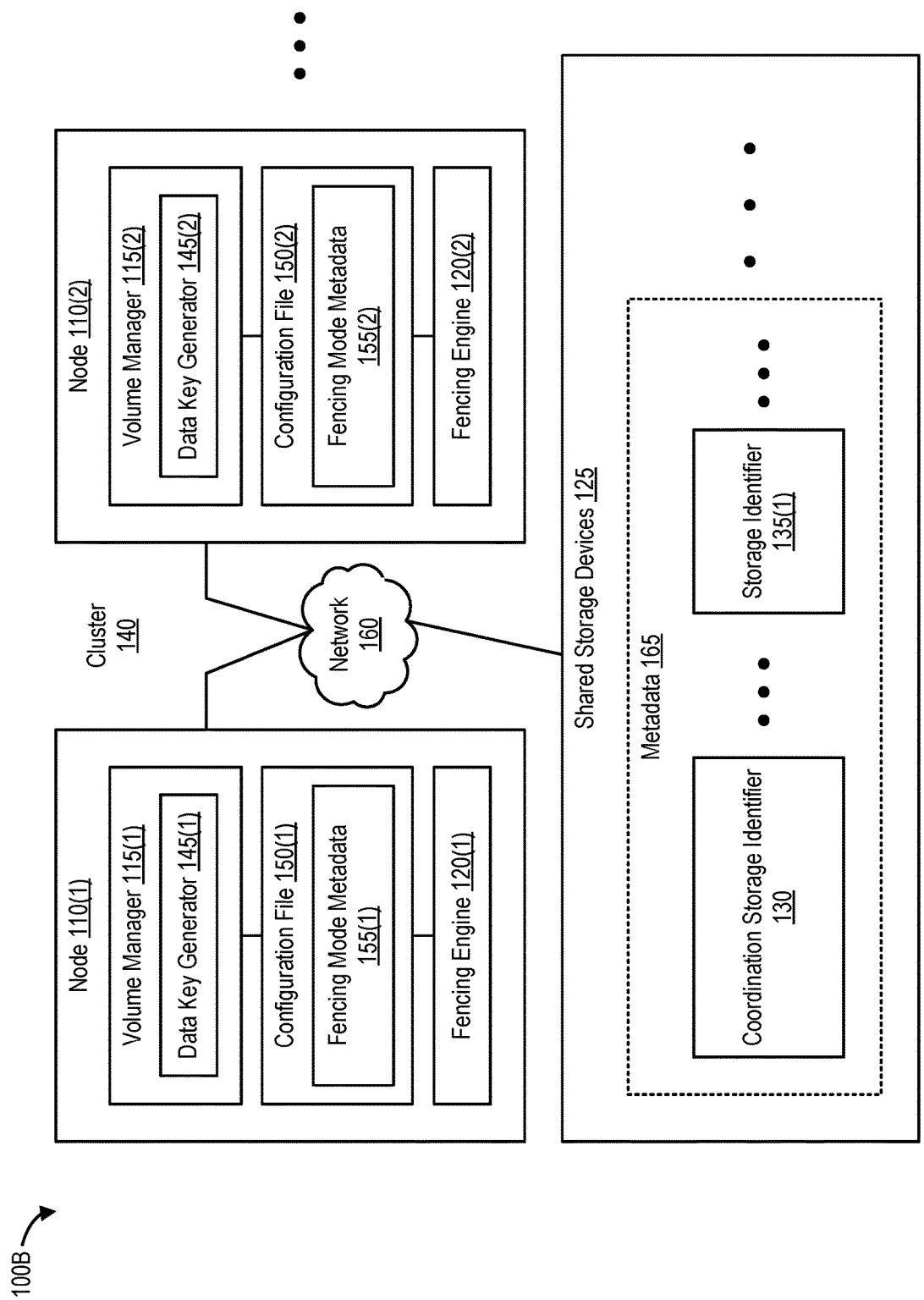
FIG. 1B is a block diagram 100B of a computing cluster that is configured to perform input/output (I/O) fencing without dedicated arbitrators, according to one embodiment of the present disclosure.

FIG. 1B is a block diagram 100B of a computing cluster that is configured to perform input/output (I/O) fencing without dedicated arbitrators, according to one embodiment. As shown in FIG. 1B, cluster 140 includes at least nodes 110(1) and 110(2) communicatively coupled to shared storage devices 125 via network 160. Volume manager 115(1) of node 110(1) includes a data key generator 145(1). Data key generator 145(1) generates coordination storage identifier 130 and/or storage identifier 135(1). Coordination storage identifier 130 and storage identifier 135(1) are data keys that can be registered on Logical Unit Numbers (LUNs) (e.g., LUNs that identify a coordinator and data disk and a data disk, respectively).

Node 110(1) also includes a configuration file 150(1) which further includes fencing mode metadata 155(1). In one embodiment, fencing mode metadata 155(1) includes information indicating that an I/O fencing operation can be performed by fencing engine 120(1) without using dedicated arbitrators. Similarly, volume manager 115(2) of node 110(2) includes a data key generator 145(2), a configuration file 150(2) that includes fencing mode metadata 155(2), and a fencing engine 120(2). In another embodiment, fencing mode metadata 155(2) includes information indicating that an I/O fencing operation can be performed by fencing engine 120(2) without using dedicated arbitrators.

Shared storage device 125 stores coordination storage identifier 130 and storage identifiers 135(1)-(N) generated by data key generators 145(1) and/or 145(2) as metadata 165. In certain embodiments, coordination storage identifier 130 is a data key that is registered on a LUN that is designated as a coordinator and data disk by appliance 105, and storage identifier 135(1) is the same data key that is registered on LUNs that identify data disks (other than coordinator and data disk). Therefore, a data key is a mechanism for permitting nodes executing in cluster 140 to access one or more disks in shared storage devices 125. For example, a data key generated by data key generator 145(1) and stored on a disk in shared storage devices 125, permits node 110(1) to access data from that given disk. Similarly, another data key generated by data key generator 145(2) and stored on a disk in shared storage devices 125, permits node 110(2) to access data from that given disk.

In certain embodiments, volume managers 115(1) and 115(2) employ Small Computer System Interface-3 (SCSI-3) key-based reservation (e.g., called persistent reservation (PR)) to provide access to one or more of shared storage devices 125 only to connected members (e.g., nodes 110(1) and 110(2)). Such persistent reservation operations can include at least a register operation, an unregister operation, a reserve operation, or a preempt operation, and can be based on nodes 110(1) and 110(2) accessing LUNs on SCSI-3 disks that are part of shared storage devices 125 as part of performing the persistent reservation operation(s).

For example, SCSI-3 PR enables access for multiple nodes to a shared storage device, and simultaneously blocks access to the shared storage device for other nodes. SCSI-3 reservations are persistent across SCSI bus resets (e.g., of a Host Bus Adaptor (HBA)) and support multiple paths from a host to a disk (e.g., a SCSI-3 compliant disk). As noted, SCSI-3 PR uses registration and reservation to perform I/O fencing operations. Each node registers its own "key" (e.g., a data key) with a SCSI-3 device (e.g., a shared storage device). Multiple nodes registering keys form a membership and establish a reservation, typically set to "Write Exclusive Registrations Only" (WERO). The WERO setting enables only registered nodes to perform write operations. For a given disk, only one reservation can exist amidst numerous registrations.

In SCSI-3 PR-based fencing, write access can be blocked by removing (or ejecting) a registration from a shared storage device. Only registered nodes can "eject" or remove the registration of another node. A node wishing to eject another node can issue a "preempt and abort" command. Ejecting a node is final and atomic; an ejected node cannot eject another node. In clustered environments, a node registers the same data key for all paths to the shared storage device. Therefore, a single preempt and abort command can be used to eject a node from all paths to the shared storage device.

The same SCSI-3 data disks that are controlled by volume managers 115(1) and 115(2) can be used for storage as well as for I/O fencing purposes. Because the appliance storage (e.g., shared storage devices 125) is volume-manager-enabled, fencing engines 120(1) and 120(2) can coordinate I/O fencing operations with volume managers 115(1) and 115(2), and employ the above-described data key PR mechanism to perform I/O fencing operations.

Example of Cluster Startup and Shutdown

Figure 2A:
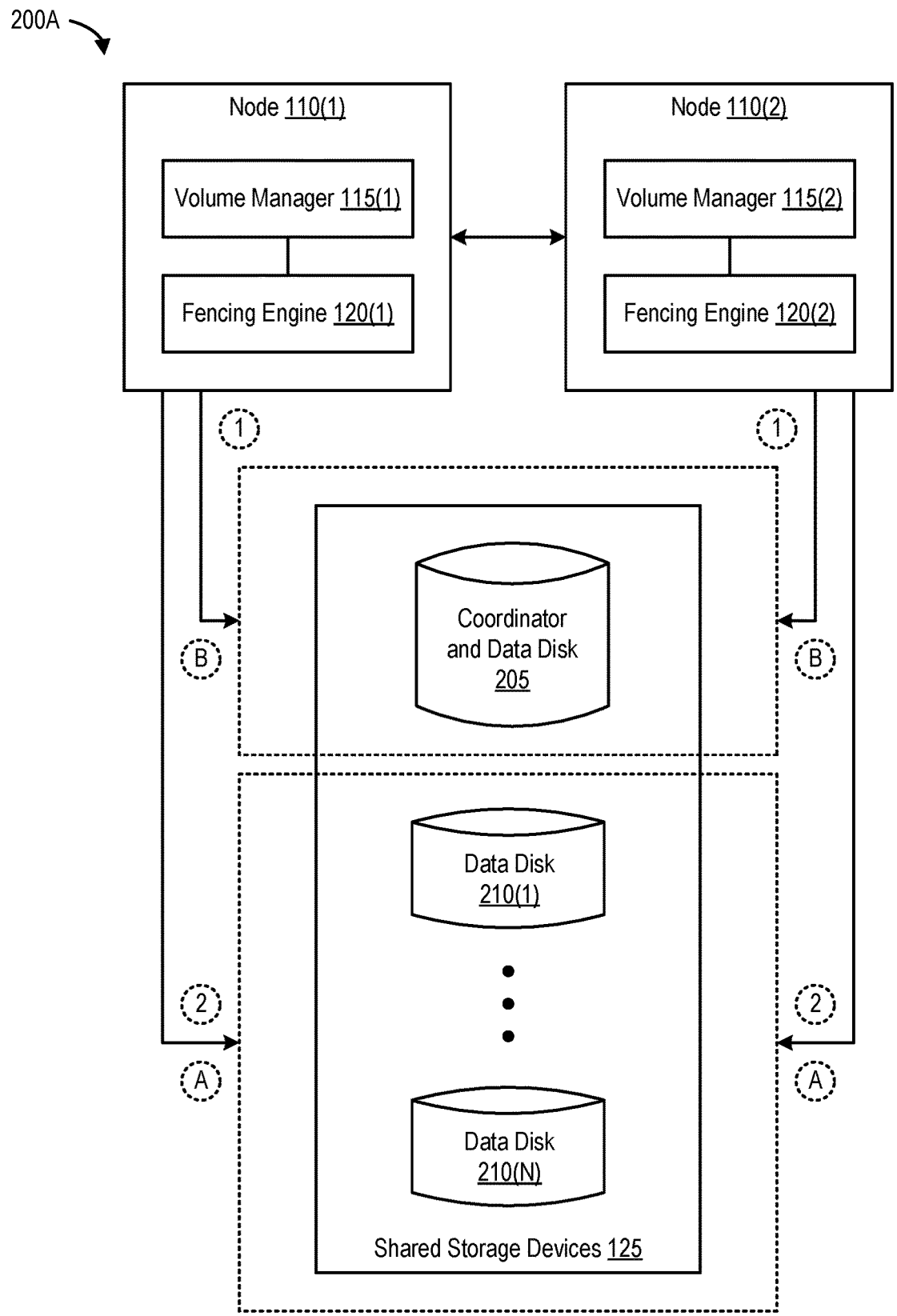
FIG. 2A is a block diagram 200A of a computing cluster that is configured for startup and shutdown of nodes, according to one embodiment of the present disclosure.

FIG. 2A is a block diagram 200A of a computing cluster that is configured for startup and shutdown of nodes, and also illustrates data disk sharing, according to one embodiment. As shown in FIG. 2A, nodes 110(1) and 110(2) share a single coordinator and data disk (e.g., coordinator and data disk 205), and one more data disks (e.g., data disks 210(1)-(N)) that are part of shared storage devices 125. In one embodiment, coordinator and data disk 205 is identified by coordination storage identifier 130, and data disks 210(1)-(N) are identified by storage identifiers 135(1)-(N), respectively. When appliance 105 is configured in high-availability mode, appliance 105 designates exactly one volume manager-managed data LUN as a fencing coordination point (e.g., as coordinator and data disk 205).

In one embodiment, volume manager 115(1) is a client of fencing engine 120(1) and is higher in the stack. Therefore, during startup, when node 110(1) joins cluster 140, fencing engine 120(1) becomes operational before volume manager 115(1). Fencing engine 120(1) comes up (or becomes operational) first and places, registers, and/or stores a volume manager-compliant key (e.g., a data key generated by data key generator 145(1) in volume manager 115(1) such as APGR001) on a data disk that is chosen by appliance 105 to be shared by fencing engine 120(1) and volume manager 115(1) (e.g., coordinator and data disk 205). This example process is illustrated by left dotted (1) in FIG. 2A.

Next, volume manager 115(1) comes up (or becomes operational) and places, registers, and/or stores the same data key (e.g., APGR001) on all data disks controlled by volume manager 115(1), including coordinator and data disk 205 (e.g., coordinator and data disk 205 and data disks 210(1)-(N)). It should be noted however that registration of the same data key (e.g., APGR001) by volume manager 115(1) on coordinator and data disk 205 (e.g., a data key that has been previously registered by fencing engine 120(1) on coordinator and data disk 205) is an idempotent operation (e.g., with a register-ignore option). In this example, APGR001 is coordination storage identifier 130 and storage identifiers 135(1)-(N), and coordinator and data disk 205 is a designated LUN. This example process is illustrated by left dotted (2) in FIG. 2A.

Similarly, in another embodiment, volume manager 115(2) is a client of fencing engine 120(2) and is higher in the stack. Therefore, during startup, when node 110(2) joins cluster 140, fencing engine 120(2) becomes operational before volume manager 115(2). Fencing engine 120(2) comes up (or becomes operational) first and places, registers, and/or stores a volume manager-compliant key (e.g., a data key generated by data key generator 145(2) in volume manager 115(2) such as BPGR001) on a data disk that is chosen by appliance 105 to be shared by fencing engine 120(2) and volume manager 115(2) (e.g., coordinator and data disk 205). This example process is illustrated by right dotted (1) in FIG. 2A.

Next, volume manager 115(2) comes up (or becomes operational) and places, registers, and/or stores the same data key (e.g., BPGR001) on all data disks controlled by volume manager 115(2), including coordinator and data disk 205 (e.g., coordinator and data disk 205 and data disks 210(1)-(N)). Registration of the same data key (e.g., BPGR001) by volume manager 115(2) on coordinator and data disk 205 (e.g., a data key that has been previously registered by fencing engine 120(2) on coordinator and data disk 205) is an idempotent operation (e.g., with a register-ignore option). In this example, BPGR001 is another/different coordination storage identifier and other/different storage identifiers other than coordination storage identifier 130 and storage identifiers 135(1)-(N), respectively, and coordinator and data disk 205 is a designated LUN. This example process is illustrated by right dotted (2) in FIG. 2A.

During shutdown, volume manager 115(1) winds down first and removes the data key (e.g., APGR001) from all data disks (e.g., data disks 210(1)-(N)), including coordinator and data disk 205. This example process is illustrated by left dotted (A) in FIG. 2A. Fencing engine 120(1) goes down next and attempts to remove the data key (e.g., APGR001) from coordinator and data disk 205. If volume manager 115(1) has already removed the data key from coordinator and data disk 205, fencing engine 120(1) determines that the data key has been removed from coordinator and data disk 205. If for some reason the data key is still present on coordinator and data disk 205, fencing engine 120(1) removes or ejects the data key (e.g., APGR001) from coordinator and data disk 205 (e.g., coordination storage identifier 130). This example process is illustrated by left dotted (B) in FIG. 2A.

Similarly, during shutdown, volume manager 115(2) winds down first (e.g., by virtue of being higher in the stack) and removes the data key (e.g., BPGR001) from all data disks (e.g., data disks 210(1)-(N)), including coordinator and data disk 205. This example process is illustrated by right dotted (A) in FIG. 2A. Fencing engine 120(2) goes down next and attempts to remove the data key (e.g., BPGR001) from coordinator and data disk 205. If volume manager 115(2) has already removed the data key from coordinator and data disk 205, fencing engine 120(2) determines that the data key has been removed from coordinator and data disk 205. If for some reason the data key is still present on coordinator and data disk 205, fencing engine 120(2) removes or ejects the data key (e.g., BPGR001) from coordinator and data disk 205 (e.g., another coordination storage identifier associated with node 110(2) other than coordination storage identifier 130, which is associated with node 110(1)). This example process is illustrated by right dotted (B) in FIG. 2A.

Example of Network Partition

In the event that communication between the nodes fails, such as when a portion of the network fails during a network partition, each of two or more sub-clusters of nodes can determine that the other sub-cluster of nodes has failed (or might have failed). For example, a race (also called a "fencing race") can occur between the two (or more) sub-clusters of nodes, with control modules of each sub-cluster of nodes determining that the other sub-cluster of nodes is malfunctioning.

Figure 2B:
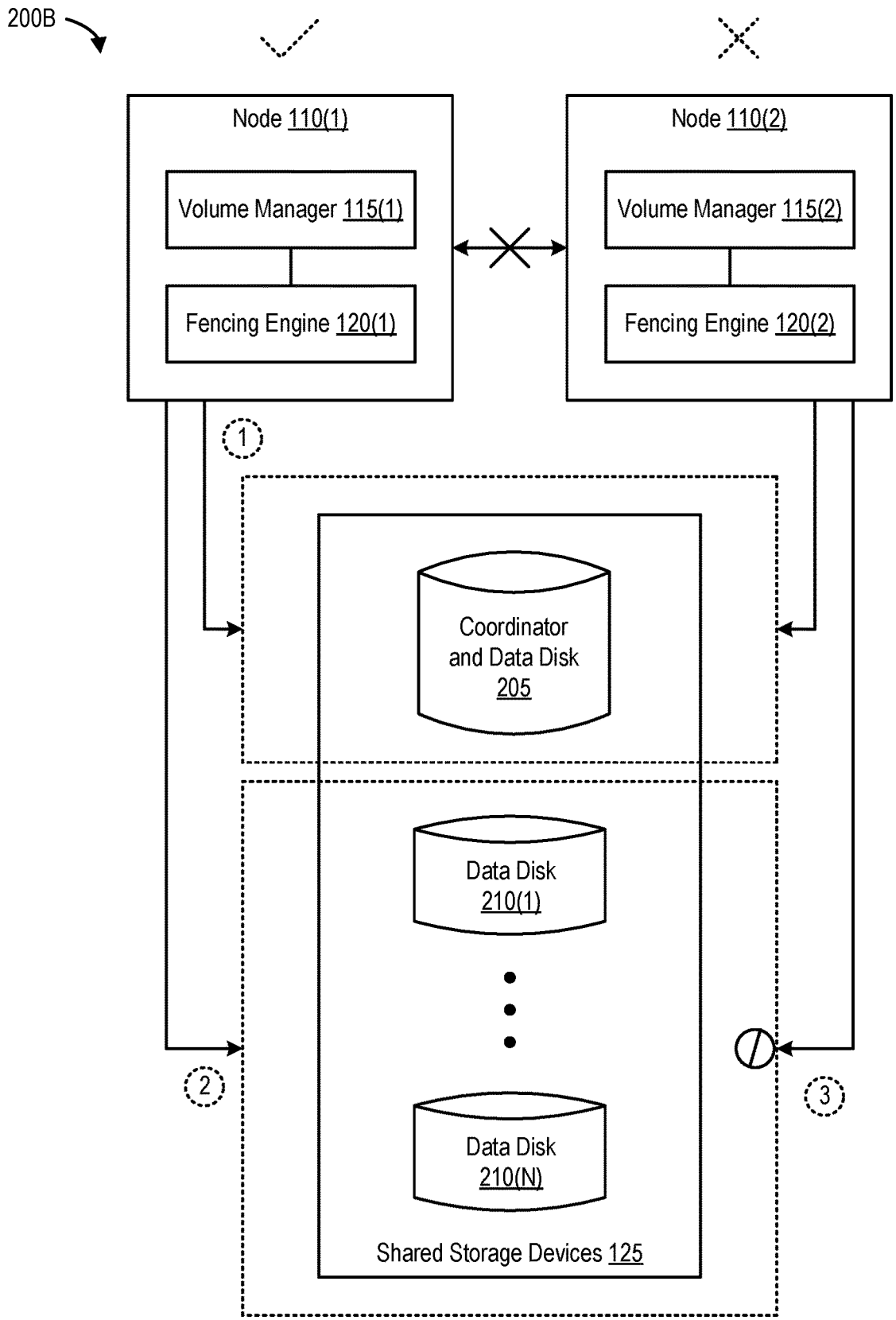
FIG. 2B is a block diagram 200B of a computing cluster that is configured for network partition, according to one embodiment of the present disclosure.

FIG. 2B is a block diagram 200B of a computing cluster that is configured for network partition, according to one embodiment. As shown in FIG. 2B, if there is a network partition (e.g., nodes 110(1) and 110(2) are now part of different sub-clusters), fencing engine on the winning node (e.g., fencing engine 120(1) on node 110(1)) ejects or removes the data key of the loser node (e.g., the another coordination storage identifier such as data key BPGR001 of node 110(2)) from coordinator and data disk 205, declares a fencing race, and notifies the result of the fencing race to volume manager 115(1). This example process is illustrated by dotted (1) in FIG. 2B.

Next, based on the fencing race result, volume manager 115(1) removes the data key of the loser node (e.g., the other storage identifiers such as data keys BPGR001 of node 110(2)) from all data disks (e.g., data disks 210(1)-(N)), including coordinator and data disk 205, which in this example, has already been removed from coordinator and data disk 205 by fencing engine 120(1) as part of the example process illustrated by dotted (1). This second and subsequent example process is illustrated by dotted (2) in FIG. 2B. Therefore, it will be appreciated that, as a result of the I/O fencing operation performed by fencing engine 120(1) in conjunction with volume manager 115(1), node 110(2) is blocked and denied access to all data disks (e.g., data disks 210(1)-(N)) without the use of dedicated arbitrators. This example process is illustrated by dotted (3) in FIG. 2B.

Example of Input/Output (I/O) Fencing without Dedicated Arbitrators

In one embodiment, node 110(1) stores a coordination storage identifier (e.g., coordination storage identifier 130) in a storage device (e.g. coordinator and data disk 205 that is part of shared storage devices 125) as metadata (e.g., metadata 165). In this example, the coordination storage identifier 130 is associated with node 110(1) of cluster 140 coupled to shared storage devices 125. Fencing engine 120(1), in conjunction with volume manager 115(1) performs I/O fencing operations using the coordination storage identifier (e.g., as described in relation to FIGS. 2A and 2B).

In another embodiment, node 110(1) accesses configuration file 150(1) that includes fencing mode metadata 155(1). Fencing mode metadata 155(1) identifies the coordination storage identifier (e.g., designated by appliance 105 as one of the CVM-managed LUNs for VxFEN coordination point). The coordination storage identifier identifies coordinator and data disk 205, and the coordination storage identifier is a data key generated by volume manager 115(1) (e.g., using data key generator 145(1)) executed by and implemented on node 115(1) (e.g., as shown in FIG. 1B).

In some embodiments, fencing engine 120(1) identifies one or more storage identifiers other than the coordination storage identifier (which can be the same data key, e.g., APGR001) to identify one or more data disks (e.g., data disks 210(1)-(N)), determines that another node other than node 110(1) has lost a fencing race (e.g., node 110(2)), and determines whether the data key has been removed from coordinator and data disk 205 by volume manager 115(1). If the data key has not been removed from coordinator and data disk 205, fencing engine 120(1) deletes the data key from coordinator and data disk 205.

In other embodiments, fencing engine 120(1) detects that the cluster is partitioned into two or more network partitions (e.g., as shown in FIG. 2B), and ejects the data key from coordinator and data disk 205. Upon ejecting the data key from coordinator and data disk 205, fencing engine 120(1) determines a result of a fencing race that is performed as part of an I/O fencing operation. In certain embodiments, the fencing engine 120(1) determines node 110(2) is a loser node, sends a notification to volume manager 115(1) to delete the data key from one or more data disks other than coordinator and data disk (e.g., data disks 210(1)-(N)), and receives confirmation from volume manager 115(1) that the data key has been ejected from one or more data disks. This process can also be performed by fencing engine 120(2) in conjunction with volume manager 115(2) if node 110(2) is the winner node and node 110(1) is the loser node (e.g., using another coordination storage identifier/other storage identifiers such as data key BPGR001 as shown in FIGS. 2A and 2B).

FIG. 3 is table 300A that illustrates a fencing operations table, according to one embodiment. Fencing operations table 305 includes at least a volume manager action field 310 and a fencing engine action field 315. Although the processes illustrated in fencing operations table 305 are with respect to node 110(1) and data key APGR001, the same processes are applicable to node 110(2) and data key BPGR001. First, fencing engine 120(1) registers a volume manager complaint data key (e.g., APGR001) on a designated coordination LUN. Volume manager 115(1) then registers the same data key (e.g., APGR001) on LUNs managed by volume manager 115(1) (e.g., data disks 210(1)-(N)) including a coordination LUN (e.g., coordinator and data disk 205).

At stack wind down, volume manager 115(1) removes the data keys from LUNs, and fencing engine 120(1) removes the data key (e.g., APGR001) from the coordination LUN if the data key has not been removed by volume manager 115(1). Next, fencing engine 115(1) ejects the data key from the coordination LUN at time of network partition and node hang, and declares a fencing race result. Finally, volume manager 115(1) receives notification from the winner node (e.g., node 110(1)) to clear the data keys from the remaining LUNs (e.g., data disks 210(1)-(N)), ejects the data keys from the remaining LUNs, and resumes (data) operations.

Similarly, fencing engine 120(2) can register, place, and/or store a volume manager complaint data key (e.g., BPGR001) on a designated coordination LUN. Volume manager 115(2) can then register the same data key (e.g., BPGR001) on LUNs managed by volume manager 115(2) (e.g., data disks 210(1)-(N)) including a coordination LUN (e.g., coordinator and data disk 205). At stack wind down, volume manager 115(2) can remove the data keys from LUNs, and fencing engine 120(2) removes the data key (e.g., BPGR001) from the coordination LUN if the data key has not been removed by volume manager 115(2). Next, fencing engine 115(2) can eject the data key from the coordination LUN at time of network partition and node hang, and declares a fencing race result. Finally, volume manager 115(2) can receive notification from the winner node (e.g., node 110(2)) to clear the data keys from the remaining LUNs (e.g., data disks 210(1)-(N)), eject the data keys from the remaining LUNs, and resume (data) operations.

Example Processes of Input/Output (I/O) Fencing without Dedicated Arbitrators

Figure 4:
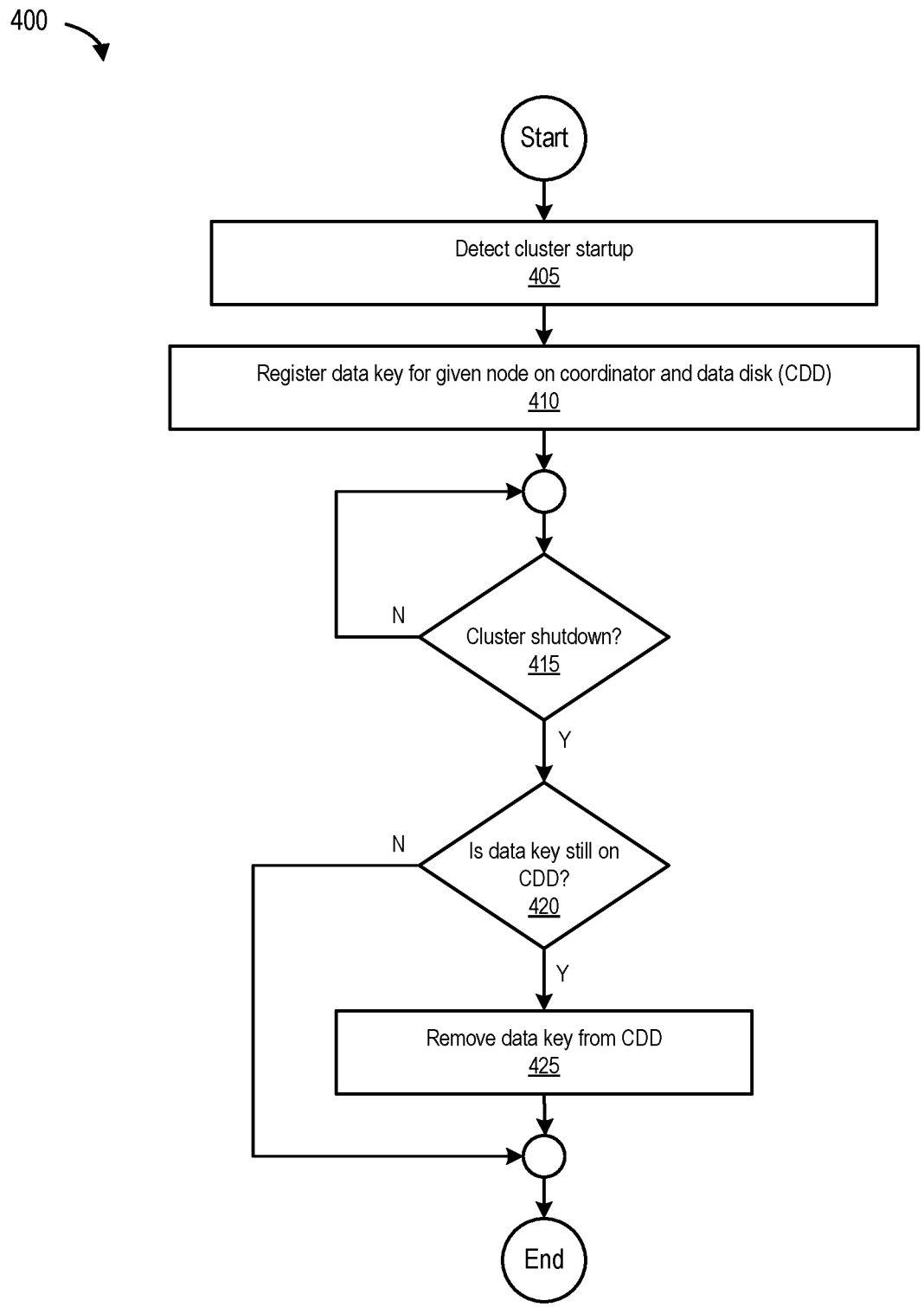
FIG. 4 is a flowchart 400 that illustrates a process for registering a data key on a designated coordinator and data disk, according to one embodiment of the present disclosure.

FIG. 4 is a flowchart 400 that illustrates a process for registering a data key on a designated coordinator and data disk, according to one embodiment. The process begins at 405 by detecting cluster startup. At 410, the process registers a (CVM-compliant) data key (e.g., a coordination storage identifier such as coordination storage identifier 130) for a given node on a (designated) coordinator and data disk (CDD). At 415, the process determines if there is a cluster shutdown (e.g., initiated due to network partition, node hang, and the like). If there is no cluster shutdown, the process loops back to 415. However, if there is a cluster shutdown (initiated), the process, at 420, determines whether the data key is still present on the CDD.

If the data key is not on the (designated) CDD, the process ends. However, if the data key is present on the CDD (e.g., on coordinator and data disk 205 that is initially designated as a coordination LUN by appliance 105 during high-availability mode configuration), the process ends at 425 by removing the data key (e.g., coordination storage identifier 130) from the CDD.

Figure 5:
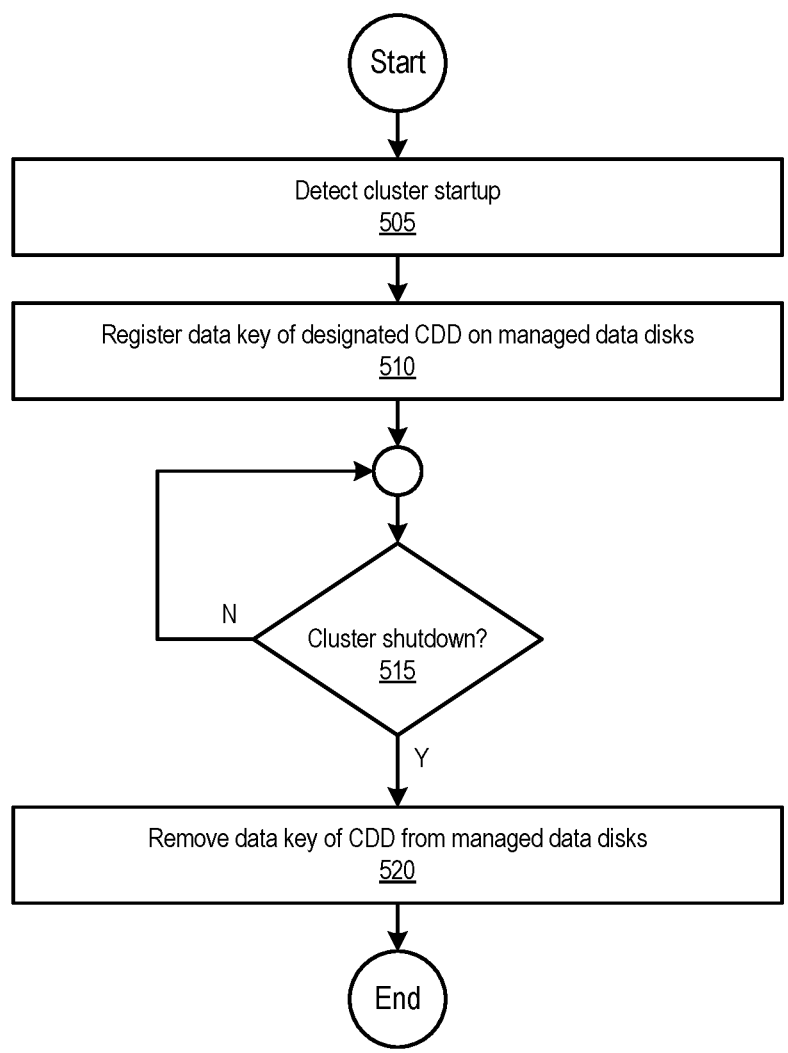
FIG. 5 is a flowchart 500 that illustrates a process for removing data key(s) from data disk(s) upon cluster shutdown, according to one embodiment of the present disclosure.

FIG. 5 is a flowchart 500 that illustrates a process for removing data key(s) from data disk(s) upon cluster shutdown, according to one embodiment. The process begins at 505 by detecting cluster startup. At 510, the process registers, places, and/or stores the (e.g., the same) data key (e.g., storage identifiers such as storage identifiers 135(1)-(N) that use the same data key as coordination storage identifier 135) on managed data disks (e.g., LUNs managed by a volume manager such as LUNs identifying data disks 210(1)-(N)). At 515, the process determines if there is a cluster shutdown initiated (e.g., as the result of network partition, node hang, and the like). If there is no cluster shutdown (initiated), the process loops back to 515. However, if a cluster shutdown has been initiated, the process ends at 520 by removing the data keys (e.g., storage identifiers) from managed data disks.

Figure 6:
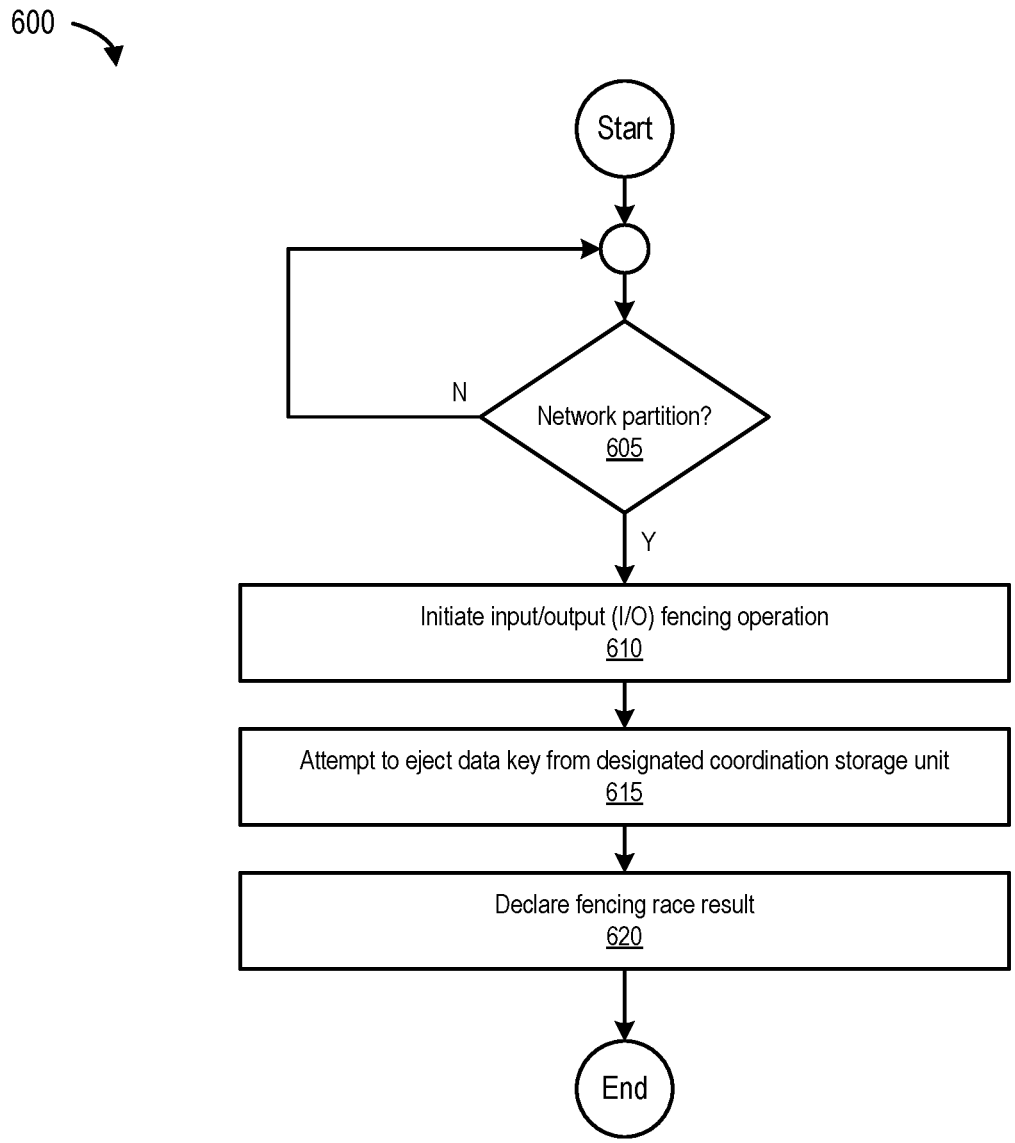
FIG. 6 is a flowchart 600 that illustrates a process for declaring a fencing race result upon network partition, according to one embodiment of the present disclosure.

FIG. 6 is a flowchart 600 that illustrates a process for declaring a fencing race result upon network partition, according to one embodiment. The process begins at 605 by determining if there is a network partition (e.g., as illustrated in FIG. 2B). If there is no network partition, the process loops back to 605. However, if there is a network partition, the process, at 610, initiates an I/O fencing operation, and at 615, attempts to eject the data key from the designated coordination storage unit (e.g., from coordinator and data disk 205). The process ends at 620 by declaring a fencing race result.

Figure 7:
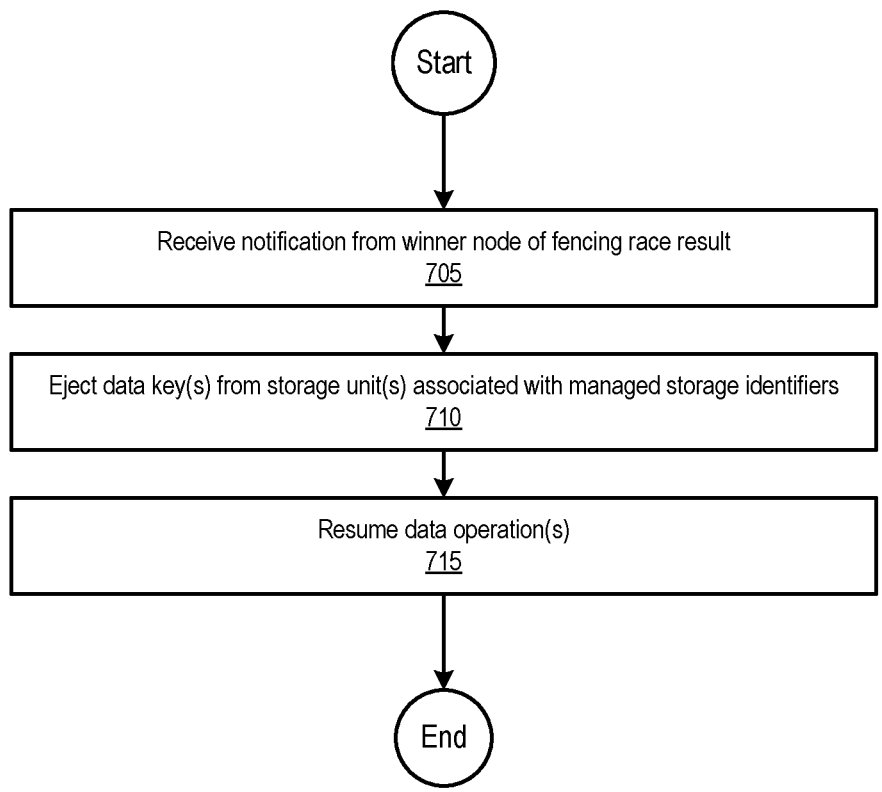
FIG. 7 is a flowchart 700 that illustrates a process for resuming data operations after performing an I/O fencing operation, according to one embodiment of the present disclosure.

FIG. 7 is a flowchart 700 that illustrates a process for resuming data operations after performing an I/O fencing operation, according to one embodiment. The process begins at 705 by receiving notification from a winner node of the fencing race result. At 710, the process ejects data key(s) from storage unit(s) (e.g., data disks 210(1)-(N)) associated with managed storage identifiers (e.g., storage identifiers 135(1)-(N)). The process ends at 715 by resuming data operation(s).

Example Computing Environment

Figure 8:
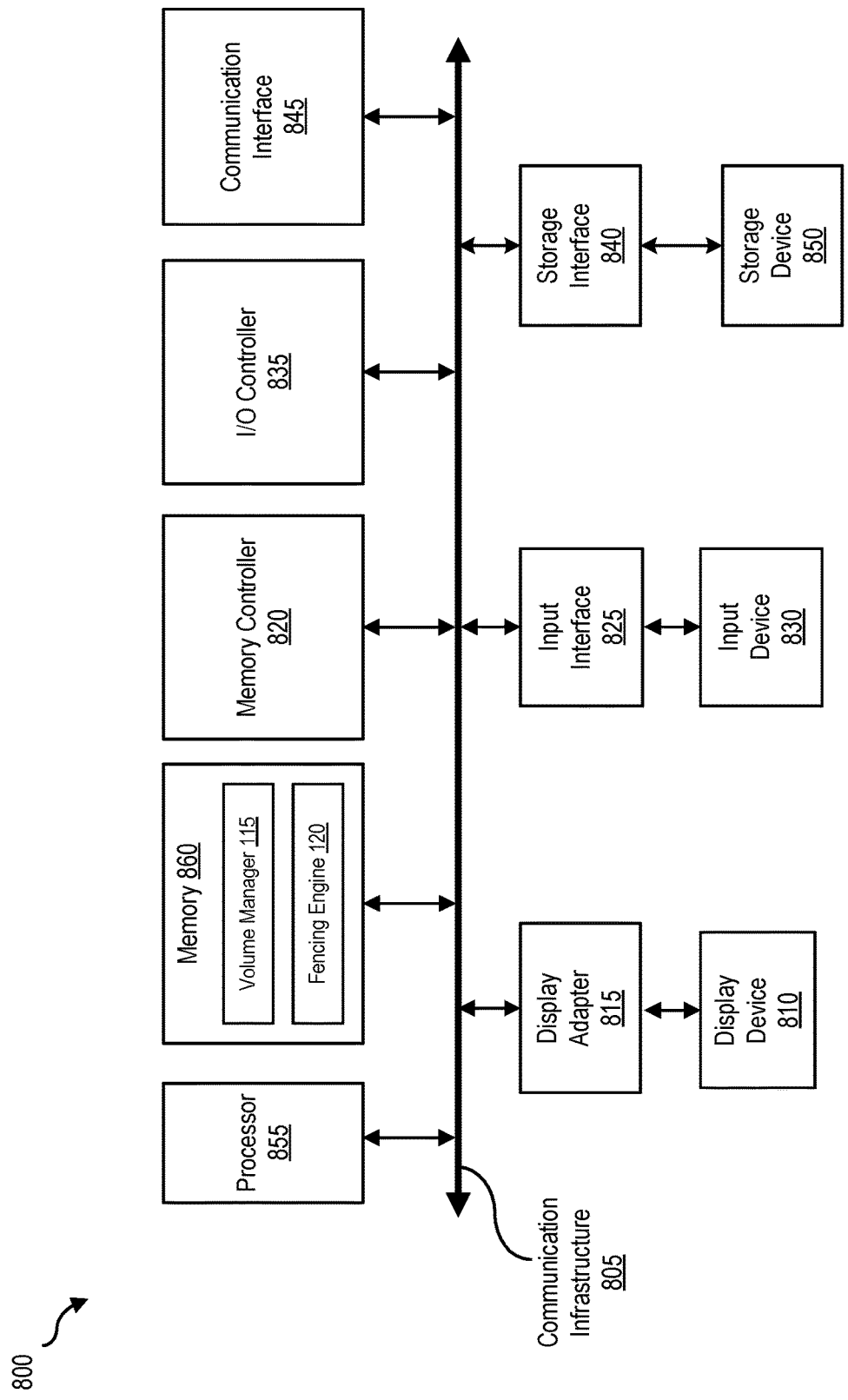
FIG. 8 is a block diagram 800 of a computing system, illustrating how a volume manager and a fencing engine can be implemented in software, according to one embodiment of the present disclosure.

FIG. 8 is a block diagram 800 of a computing system, illustrating how a volume manager and a fencing engine can be implemented in software, according to one embodiment. Computing system 800 can include nodes 110(1)-(N), and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes volume manager 115 and/or fencing engine 120, computing system 800 becomes a special purpose computing device that is configured to perform I/O fencing without dedicated arbitrators.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing volume manager 115 and/or fencing engine 120 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850, coordinator and data disk 205, and/or data disks 210(1)-(N). When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
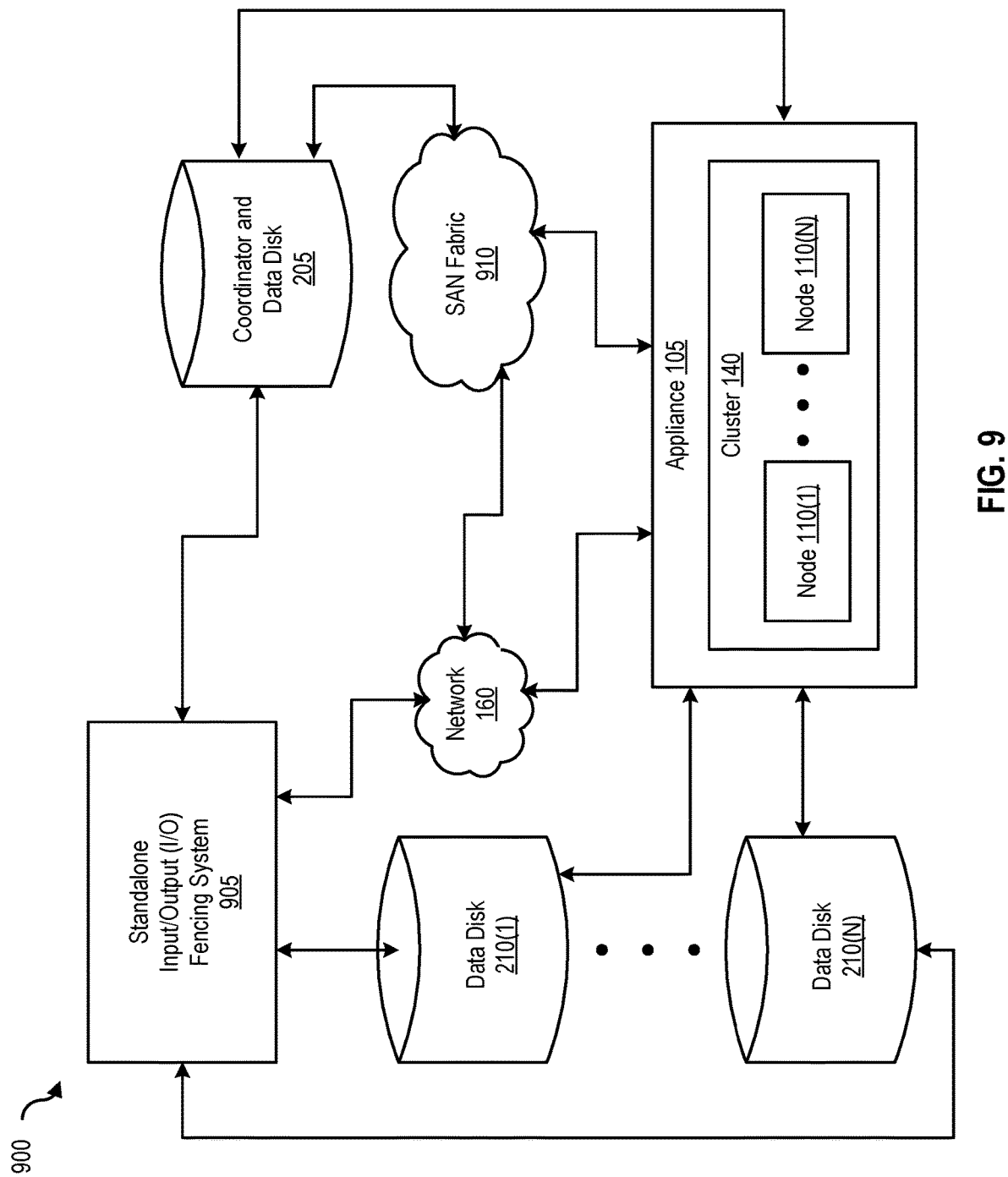
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with nodes 110(1)-(N), coordinator and data disk 205, data disks 210(1)-(N), and/or standalone I/O fencing system 905 using various protocols, such as Network File System (NFS), Server Message Block (SMB), or Common Internet File System (CIFS). Network 160 generally represents any type or form of computer network or architecture capable of facilitating communication between appliance 105, coordinator and data disk 205, data disks 210(1)-(N), and/or standalone I/O fencing system 905.

In certain embodiments, a communication interface, such as communication interface 845 in FIG. 8, may be used to provide connectivity between appliance 105, coordinator and data disk 205, data disks 210(1)-(N), and/or standalone I/O fencing system 905, and network 160. Data disks 210(1)-(N) are referred to herein as such because each of such data disks are dedicated to storing data, in at least certain embodiments. Similarly, coordinator and data disk 205 is referred to herein as such because coordinator and data disk 205 stores data and is used to perform I/O fencing operations without dedicated arbitrators. The embodiments described and/or illustrated herein are not limited to the Internet or any particular network-based environment.

In some embodiments, network 160 can be a Storage Area Network (SAN). In other embodiments, standalone I/O fencing system 905 may be part of nodes 110(1)-(N), or may be separate. If separate, standalone I/O fencing system 905 and nodes 110(1)-(N) and appliance 105 may be communicatively coupled via network 160. In one embodiment, all or a portion of one or more of the disclosed embodiments may be encoded as a computer program and loaded onto and executed by nodes 110(1)-(N), and/or standalone I/O fencing system 905, or any combination thereof. All or a portion of one or more of the embodiments disclosed herein may also be encoded as a computer program, stored on nodes 110(1)-(N), standalone I/O fencing system 905, data disks 210(1)-(N), and/or coordinator and data disk 205, and distributed over network 160.

In some examples, all or a portion of nodes 110(1)-(N), standalone I/O fencing system 905, data disks 210(1)-(N), and/or coordinator and data disk 205 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, volume manager 115 and/or fencing engine 120 may transform the behavior of nodes 110(1)-(N) in order to cause nodes 110(1)-(N) to perform I/O fencing without dedicated arbitrators. For example, multiple SCSI-3 compliant engines and/or modules such as volume manager 115 and/or fencing engine 120 can work together on the same set of SCSI-3 disks.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method for use in an appliance, wherein the appliance includes a plurality of nodes configured to access a plurality of data disks, the method comprising:
designating a data disk of the plurality of data disks as a coordinator and data disk, wherein
the data disk is designated as the coordinator and data disk by storing metadata in the data disk, and
the metadata represents a coordination storage identifier;

storing, by a fencing engine, volume manager-compliant data keys on the coordinator and data disk for each of the plurality of nodes, wherein
each volume manager-compliant data key is respectively associated with a node of the plurality of nodes;
storing, by a volume manager of each node, the volume manager-compliant data key for each node on the coordinator and data disk and on data disks shared by the node; and
performing an input/output fencing operation, wherein the input/output fencing operation comprises
identifying the coordinator and data disk using the coordination storage identifier, and
ejecting the volume manager-compliant data key for at least one node of the plurality of nodes from at least one of the plurality of data disks shared by the at least one node of the plurality of nodes.

2. The computer-implemented method of claim 1, further comprising:
accessing a configuration file, wherein
the configuration file comprises
the metadata representing the coordination storage identifier and
the volume manager-compliant data key of the node.

3. The computer-implemented method of claim 2, wherein
the volume manager-compliant data key for a node is generated by the volume manager of the node.

4. The computer-implemented method of claim 3, further comprising:
identifying at least one of the plurality of data disks as a data disk shared by a node, wherein
identifying at least one the plurality of data disks comprises accessing the volume manager-compliant data key on the data disk shared by the node.

5. The computer-implemented method of claim 4, further comprising:
determining, by a node, that another node has lost a fencing race;
determining whether the volume manager-compliant data key of the another node has been ejected from the coordinator and data disk by the fencing engine of the node; and
if the volume manager-compliant data key of the another node has not been ejected from the coordinator and data disk by the fencing engine of the node, ejecting the volume manager-compliant data key from the coordinator and data disk.

6. The computer-implemented method of claim 5, further comprising:
detecting that a cluster of nodes is partitioned into a plurality of network partitions, wherein
the plurality of nodes form the cluster of nodes.

7. The computer-implemented method of claim 6, further comprising:
executing a fencing race as part of the input/output fencing operation;
determining that the node is a winner node and that the another node is a loser node;
sending a notification to the volume manager of the winner node to eject the volume manager-compliant data key of the loser node from each data disk shared by the another node other than the coordinator and data disk; and
receiving confirmation from the volume manager of the winner node that the volume manager-compliant data key of the another node has been ejected from each data disk shared by the another node other than the coordinator and data disk.

8. The computer-implemented method of claim 7, wherein
the input/output fencing operation is performed without one or more dedicated arbitrators; and
the input/output fencing operation is performed by the fencing engine and the volume manager of a node on a same set of Small Computer System Interface (SCSI)-3 compliant disks.

9. A non-transitory computer readable storage medium comprising program instructions executable to perform a method for use in an appliance, wherein the appliance includes a plurality of nodes configured to access a plurality of data disks, the method comprising:
designating a data disk of the plurality of data disks as a coordinator and data disk, wherein
the data disk is designated as the coordinator and data disk by storing metadata in the data disk, and
the metadata represents a coordination storage identifier;
storing, by a fencing engine, volume manager-compliant data keys on the coordinator and data disk for each of the plurality of nodes, wherein
each volume manager-compliant data key is respectively associated with a node of the plurality of nodes;
storing, by a volume manager of each node, the volume manager-compliant data key for each node on the coordinator and data disk and on data disks shared by the node; and
performing an input/output fencing operation, wherein the input/output fencing operation comprises
identifying the coordinator and data disk using the coordination storage identifier, and
ejecting the volume manager-compliant data key for at least one node of the plurality of nodes from at least one of the plurality of data disks shared by the at least one node of the plurality of nodes.

10. The non-transitory computer readable storage medium of claim 9, wherein the method further comprises:
accessing a configuration file, wherein
the configuration file comprises
the metadata representing the coordination storage identifier and
the volume manager-compliant data key of the node.

11. The non-transitory computer readable storage medium of claim 10, wherein
the volume manager-compliant data key for a node is generated by the volume manager of the node.

12. The non-transitory computer readable storage medium of claim 11, wherein the method further comprises:
identifying at least one of the plurality of data disks as a data disk shared by a node, wherein
identifying at least one the plurality of data disks comprises accessing the volume manager-compliant data key on the data disk shared by the node.

13. The non-transitory computer readable storage medium of claim 12, wherein the method further comprises:
determining, by a node, that another node has lost a fencing race;
determining whether the volume manager-compliant data key of the another node has been ejected from the coordinator and data disk by the fencing engine of the node;

if the volume manager-compliant data key of the another node has not been ejected from the coordinator and data disk by the fencing engine of the node, ejecting the volume manager-compliant data key from the coordinator and data disk;

detecting that a cluster of nodes is partitioned into a plurality of network partitions, wherein
the plurality of nodes form the cluster of nodes, and executing a fencing race as part of the input/output fencing operation;

determining that the node is a winner node and that the another node is a loser node;

sending a notification to the volume manager of the winner node to eject the volume manager-compliant data key from each data disk shared by the another node other than the coordinator and data disk; and receiving confirmation from the volume manager of the winner node that the volume manager-compliant data key has been ejected from each data disk shared by the another node other than the coordinator and data disk.

14. The non-transitory computer readable storage medium of claim 13, wherein
the input/output fencing operation is performed without one or more dedicated arbitrators; and
the input/output fencing operation is performed by the fencing engine and the volume manager on a same set of Small Computer System Interface (SCSI)-3 compliant disks.

15. A computer system comprising:
one or more processors; and
a computer-readable storage medium communicatively coupled to the one or more processors, wherein the computer-readable storage medium stores program instructions executable by the one or more processors to implement an appliance having a plurality of nodes configured to access a plurality of data disks, the program instructions executable by the one or more processors being further executable by the one or more processors to perform a method comprising
designating a data disk of the plurality of data disks as a coordinator and data disk, wherein
the data disk is designated as the coordinator and data disk by storing metadata in the data disk, and the metadata represents a coordination storage identifier,
storing, by a fencing engine, volume manager-compliant data keys on the coordinator and data disk for each of the plurality of nodes, wherein
each volume manager-compliant data key is respectively associated with a node of the plurality of nodes,
storing, by a volume manager of each node, the volume manager-compliant data key for each node on the coordinator and data disk and on data disks shared by the node; and
performing an input/output fencing operation, wherein the input/output fencing operation comprises
identifying the coordinator and data disk using the coordination storage identifier, and
ejecting the volume manager-compliant data key for at least one node of the plurality of nodes from at least one of the plurality of data disks shared by the at least one node of the plurality of nodes.

16. The computer system of claim 15, wherein the method further comprises:
accessing a configuration file, wherein
the configuration file comprises
the metadata representing the coordination storage identifier and
the volume manager-compliant data key of the node.

17. The computer system of claim 16, wherein
the volume manager-compliant data key for a node is generated by the volume manager of the node.

18. The computer system of claim 17, wherein the method further comprises:
identifying at least one of the plurality of data disks as a data disk shared by a node, wherein
identifying at least one the plurality of data disks comprises accessing the volume manager-compliant data key on the data disk shared by the node.

19. The computer system of claim 18, wherein the method further comprises:
determining, by a node, that another node has lost a fencing race;
determining whether the volume manager-compliant data key of the another node has been ejected from the coordinator and data disk by the fencing engine of the node;
if the volume manager-compliant data key of the another node has not been ejected from the coordinator and data disk by the fencing engine of the node, ejecting the data key from the coordinator and data disk;
detecting that a cluster of nodes is partitioned into a plurality of network partitions, wherein
the plurality of nodes form the cluster of nodes, and executing a fencing race as part of the input/output fencing operation;
determining that the node is a winner node and that the another node is a loser node;
sending a notification to the volume manager of the winner node to eject the volume manager-compliant data key from each disk shared by the another node other than the coordinator and data disk; and
receiving confirmation from the volume manager that the volume manager-compliant data key has been ejected from each of the plurality of data disks other than the coordinator and data disk.

20. The computer system of claim 19, wherein
the input/output fencing operation is performed without one or more dedicated arbitrators; and
the input/output fencing operation is performed by the fencing engine and the volume manager on a same set of Small Computer System Interface (SCSI)-3 compliant disks.

* * * * *